United States Patent
Corbett et al.

(10) Patent No.: US 10,710,146 B2
(45) Date of Patent: Jul. 14, 2020

(54) FASTENER AND FASTENING SYSTEM

(71) Applicant: Arconic Inc., Pittsburgh, PA (US)

(72) Inventors: Robert J. Corbett, Woodway, TX (US); Joseph Z. Leavelle, Lorena, TX (US)

(73) Assignee: Arconic Inc., Pittsburgh, PA (US)

( * ) Notice: Subject to any disclaimer, the term of this patent is extended or adjusted under 35 U.S.C. 154(b) by 292 days.

(21) Appl. No.: 15/785,526

(22) Filed: Oct. 17, 2017

(65) Prior Publication Data
US 2018/0111184 A1    Apr. 26, 2018

Related U.S. Application Data

(60) Provisional application No. 62/410,497, filed on Oct. 20, 2016.

(51) Int. Cl.
*F16B 35/04* (2006.01)
*B21J 15/04* (2006.01)
(Continued)

(52) U.S. Cl.
CPC .......... *B21J 15/045* (2013.01); *B21J 15/022* (2013.01); *F16B 19/1054* (2013.01); *F16B 35/04* (2013.01); *F16B 2019/1009* (2013.01)

(58) Field of Classification Search
CPC .... B21J 15/045; B21J 15/022; F16B 19/1054; F16B 2019/1009; F16B 35/04
(Continued)

(56) References Cited

U.S. PATENT DOCUMENTS

| | | |
|---|---|---|
| 2,324,142 A | 7/1943 | Eklund |
| 2,531,048 A | 11/1950 | Huck |

(Continued)

FOREIGN PATENT DOCUMENTS

| | | |
|---|---|---|
| CA | 2868329 | 5/2015 |
| CN | 1791493 A | 6/2006 |

(Continued)

OTHER PUBLICATIONS

International Search Report and Written Opinion dated Dec. 22, 2017, issued by the Korean Intellectual Property Office in International Patent Application No. PCT/US2017/056847 entitled "Fastener and Fastening System" (15 pages).

(Continued)

*Primary Examiner* — David B Jones
(74) *Attorney, Agent, or Firm* — Greenberg Traurig LLP

(57) ABSTRACT

A fastening system includes a fastener having a bolt with a pull portion having at least one pull groove, and an outer sleeve having a head with an inner face, the bolt being inserted within the sleeve. The fastening system includes a fastener installation tool having a puller with at least one tooth and a front face. The inner face of the head of the sleeve is angled at an included angle measured transverse to a longitudinal axis of the fastener, while the front face of the puller of the fastener installation tool is angled at an included angle measured transverse to a longitudinal axis of the puller. The included angles are chosen to match or be substantially the same. The front face of the puller of the fastener installation tool is adapted to engage the inner face of the outer sleeve of the fastener when the fastener installation tool engages the fastener, and the inner face of the outer sleeve facilitates the receipt of the front face of the puller and the alignment of the at least one tooth of the puller with the at least one pull groove of the bolt by allowing the puller to shift forward or backward to facilitate such alignment.

20 Claims, 2 Drawing Sheets

(51) Int. Cl.
*B21J 15/02* (2006.01)
*F16B 19/10* (2006.01)

(58) Field of Classification Search
USPC .................................................. 29/243.521
See application file for complete search history.

(56) References Cited

U.S. PATENT DOCUMENTS

| | | | |
|---|---|---|---|
| 2,531,049 A | 11/1950 | Huck | |
| 2,764,045 A | 9/1956 | Koenig | |
| 2,971,425 A | 2/1961 | Blakeley | |
| 3,029,665 A | 4/1962 | Baugh et al. | |
| 3,107,572 A | 10/1963 | Orloff | |
| 3,215,024 A * | 11/1965 | Brilmyer | F16B 19/05 411/361 |
| 3,277,771 A | 10/1966 | Reynolds | |
| 3,345,900 A | 10/1967 | Villo | |
| 3,443,474 A | 5/1969 | Blakeley et al. | |
| 3,866,998 A | 2/1975 | Lantorno | |
| 3,915,053 A | 10/1975 | Ruhl | |
| 4,299,519 A | 11/1981 | Corbett | |
| 4,312,613 A | 1/1982 | Binns | |
| 4,447,077 A | 5/1984 | Palmer | |
| 4,472,096 A | 9/1984 | Ruhl et al. | |
| 4,531,871 A | 7/1985 | Sigmund | |
| 4,597,263 A | 7/1986 | Corbett | |
| 4,649,271 A | 4/1987 | Pratt et al. | |
| 4,765,010 A * | 8/1988 | Jeal | B21H 3/022 470/11 |
| 4,813,834 A | 3/1989 | Smith | |
| 4,832,548 A | 5/1989 | Strobel | |
| 4,844,673 A * | 7/1989 | Kendall | F16B 19/1054 411/34 |
| 4,867,625 A | 9/1989 | Dixon | |
| 4,878,372 A | 11/1989 | Port et al. | |
| 4,921,384 A | 5/1990 | Nordyke | |
| 4,943,196 A | 7/1990 | Dahl | |
| 4,950,115 A | 8/1990 | Sadri | |
| 4,995,777 A | 2/1991 | Warmington | |
| 5,049,016 A | 9/1991 | Nordyke | |
| 5,083,363 A * | 1/1992 | Ransom | B23P 9/025 29/272 |
| 5,090,582 A | 2/1992 | Dixon | |
| 5,125,778 A | 6/1992 | Sadri | |
| 5,315,755 A | 5/1994 | Fulbright et al. | |
| 5,378,098 A * | 1/1995 | Andrews | F16B 19/1054 29/525.05 |
| 5,498,110 A | 3/1996 | Stencel et al. | |
| 5,548,889 A | 8/1996 | Smith et al. | |
| 5,604,968 A | 2/1997 | Fulbright et al. | |
| 5,643,751 A | 6/1997 | Stencel et al. | |
| 5,816,761 A | 10/1998 | Cassatt et al. | |
| 6,036,418 A | 3/2000 | Stencel et al. | |
| 6,213,698 B1 | 4/2001 | Cosenza | |
| 6,233,802 B1 | 5/2001 | Fulbright | |
| 6,235,582 B1 | 5/2001 | Chen | |
| 6,325,582 B1 | 12/2001 | Sadri et al. | |
| 6,497,024 B2 | 12/2002 | Fulbright | |
| 6,702,684 B2 | 3/2004 | Harbin et al. | |
| 7,195,438 B2 | 3/2007 | Harbin et al. | |
| 7,293,339 B2 | 11/2007 | Mercer et al. | |
| 7,308,842 B2 | 12/2007 | Hufnagl et al. | |
| 7,891,924 B2 | 2/2011 | Mercer et al. | |
| 7,921,530 B2 | 4/2011 | Mercer et al. | |
| 8,297,897 B2 | 10/2012 | Auriol et al. | |
| 8,322,015 B2 | 12/2012 | Pratt et al. | |
| 8,348,566 B2 | 1/2013 | Pratt | |
| 8,621,734 B2 | 1/2014 | Mercer et al. | |
| 8,727,685 B2 | 5/2014 | Corbett | |
| 2005/0079030 A1 | 4/2005 | Harbin et al. | |
| 2008/0247841 A1 | 10/2008 | Mercer et al. | |
| 2009/0053006 A1 | 2/2009 | Hufnagl et al. | |
| 2010/0074710 A1 | 3/2010 | Auriol et al. | |
| 2010/0266363 A1 | 10/2010 | Mercer et al. | |
| 2013/0025111 A1 | 1/2013 | Crutchley | |
| 2015/0211568 A1 | 7/2015 | Corbett | |
| 2015/0260217 A1 | 9/2015 | Woods et al. | |

FOREIGN PATENT DOCUMENTS

| | | |
|---|---|---|
| CN | 101360920 A | 2/2009 |
| CN | 101668956 A | 3/2010 |
| CN | 101912941 A | 12/2010 |
| CN | 203176114 U | 9/2013 |
| CN | 204458745 U | 7/2015 |
| JP | 2010537139 A | 12/2010 |
| JP | 5878672 | 2/2016 |
| TW | 557338 B | 10/2003 |
| WO | 2007/100906 A2 | 9/2007 |
| WO | 2015/116444 A1 | 8/2015 |

OTHER PUBLICATIONS

International Search Report and Written Opinion dated Jul. 18, 2013, issued by the European Patent Office in International Application No. PCT/US2013/036129.

International Search Report and Written Opinion dated Apr. 21, 2015, issued by the European Patent Office in International Application No. PCT/US2015/012153.

International Search Report and Written Opinion dated Apr. 28, 2016, issued by the European Patent Office in International Application No. PCT/US2016/014229.

International Search Report and Written Opinion dated Nov. 30, 2016, issued by the European Patent Office in International Application No. PCT/US2016/054860.

Alcoa Fastening Systems, "Blind Bolt Engineering Standard", UAB130-EU, SK12711.

Alcoa Fastening Systems, "Blind Bolt Engineering Standard", UAB130-MV, SK12742.

Huck Fasteners, "Blind Bolt Engineering Standard", UABP-EU, SK127856.

Alcoa Fastening Systems, "Blind Bolt Engineering Standard", UAB6127-EU, SK12770.

Huck Fasteners, "Blind Bolt Engineering Standard", USAB100-EU, SK12771.

Huck Fasteners, "Blind Bolt Engineering Standard", UAB100-MV, SK12772.

Alcoa Fastening Systems, "Blind Bolt Engineering Standard", OUAB130-EU, SK12801.

Alcoa Fastening Systems, "Blind Bolt Engineering Standard", OUAB6127-EU, SK12802.

Alcoa Fastening Systems, "Blind Bolt Engineering Standard", OUABP-EU, SK12803.

* cited by examiner

FASTENER AND FASTENING SYSTEM

CROSS-REFERENCE TO RELATED APPLICATION

This application is a § 111(a) application that relates to and claims the benefit of commonly-owned, co-pending U.S. Provisional Patent Application Ser. No. 62/410,497, filed Oct. 20, 2016, entitled "BLIND FASTENER," the entirety of which is incorporated herein by reference.

FIELD OF THE INVENTION

The present invention relates to a fastening system and, more particularly, a fastener and a fastener installation tool for securing work pieces together.

BACKGROUND OF THE INVENTION

Fasteners, and in particular blind fasteners, are commonly used to secure a plurality of work pieces together when it is difficult or impossible to access the blind side of one of the work pieces. Certain fasteners include a pull portion having pull grooves, while associated fastener installation tools include a puller (e.g., collet) having teeth that engage the pull grooves of the pull portion of the fastener. Alignment of the teeth of the puller and the pull grooves of the fastener is desired.

SUMMARY OF THE INVENTION

In an embodiment, a fastening system includes a fastener including a bolt having a shank and a pull portion extending from a first end of the shank and including at least one pull groove, and a sleeve adapted to receive the bolt, wherein the sleeve includes a body having a first end and a head located at the first end, wherein the head includes a first end having an inner face; and a fastener installation tool including a puller having a front face and at least one tooth that is adapted to engage the at least one pull groove of the pull portion of the bolt, wherein the inner face of the sleeve is adapted to receive and engage the front face of the puller of the fastener installation tool when the puller is engaged with the pull portion of the bolt, and wherein when the puller of the fastener installation tool is engaged with the fastener, the front face of the puller is adapted to stop against the inner face of the head of the sleeve of the fastener and the puller is adapted to shift toward or away from the sleeve and align the at least one tooth of the puller with a corresponding one of the at least one pull groove of the pull portion of the bolt.

In an embodiment, the inner face of the head of the sleeve of the fastener extends obliquely at a first included angle measured transversely from a longitudinal axis of the fastener. In an embodiment, the front face of the puller of the fastener installation tool is angled at a second included angle measured transversely from a longitudinal axis of the puller of the fastener installation tool. In an embodiment, each of the first included angle and the second included angle is about 60 degrees. In an embodiment, each of the first included angle and the second included angle is about 70 degrees. In an embodiment, each of the first included angle and the second included angle is about 80 degrees. In an embodiment, each of the first included angle and the second included angle is about 90 degrees. In an embodiment, each of the first included angle and the second included angle is about 100 degrees. In an embodiment, each of the first included angle and the second included angle is about 110 degrees. In an embodiment, each of the first included angle and the second included angle is about 120 degrees. In an embodiment, each of the first included angle and the second included angle is about 130 degrees. In an embodiment, each of the first included angle and the second included angle is about 140 degrees. In an embodiment, each of the first included angle and the second included angle is about 150 degrees. In an embodiment, each of the first included angle and the second included angle is about 160 degrees. In an embodiment, each of the first included angle and the second included angle is about 170 degrees. In an embodiment, each of the first included angle and the second included angle is about 180 degrees. In an embodiment, each of the first included angle and the second included angle is within a range of about 60 degrees to about 180 degrees. In an embodiment, the front face is concave in shape. In an embodiment, the front face is conical in shape. In an embodiment, the at least one pull groove includes a plurality of pull grooves, and wherein the at least one tooth includes a plurality of teeth. In an embodiment, each of the plurality of pull grooves is an annular groove. In an embodiment, the at least one pull groove is a helical groove.

In an embodiment, a fastener includes a bolt having a shank and a pull portion extending from a first end of the shank and including at least one pull groove; and a sleeve adapted to receive the bolt, wherein the sleeve includes a body having a first end and a head located at the first end, wherein the head includes a first end having an inner face, wherein the inner face of the sleeve is adapted to receive and engage a front face of a puller of a fastener installation tool when the puller is engaged with the pull portion of the bolt, and wherein when the puller of the fastener installation tool is engaged with the fastener, the front face of the puller is adapted to stop against the inner face of the head of the sleeve of the fastener and the puller is adapted to shift toward or away from the sleeve and align the at least one tooth of the puller with a corresponding one of the at least one pull groove of the pull portion of the bolt.

DETAILED DESCRIPTION OF THE DRAWINGS

Figure 1:
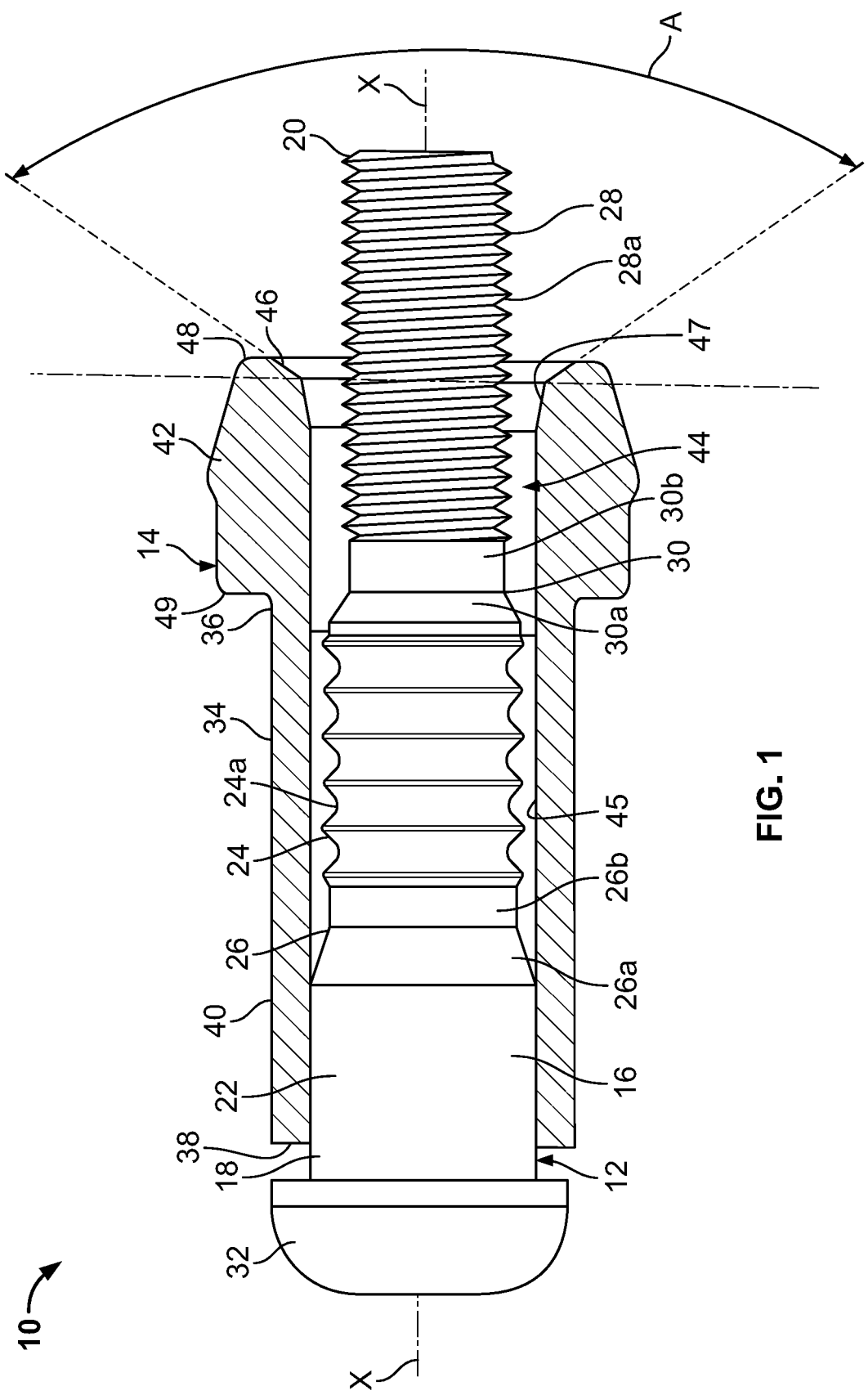
FIG. 1 is a side elevational view of a blind fastener constructed in accordance with an embodiment, with an outer sleeve employed by the blind fastener being shown in cross-section.

FIG. 1 illustrates an embodiment of a fastener 10. In an embodiment, the fastener 10 includes a bolt 12 and an outer sleeve 14 that is sized and shaped to receive the bolt 12. In an embodiment, the outer sleeve 14 is of one-piece construction. In another embodiment, the outer sleeve 14 is constructed with a plurality of components. In an embodiment, the bolt 12 includes an elongated shank 16 having a first end 18 and a second end 20 opposite the first end 18, the shank 16 being sized and shaped to extend through the outer sleeve 14. In an embodiment, the shank 16 includes a cylindrical-shaped smooth portion 22 located proximate to the first end 18, a grooved portion 24 located intermediate the first and second ends 18, 20, and a first transition portion 26 located intermediate the smooth portion 22 and the grooved portion 24. In an embodiment, the first transition portion 24 includes a frusto-conical shaped portion 26a located adjacent to the smooth portion 22 and a cylindrical-shaped portion 26b located intermediate the frusto-conical shaped portion 26a and one end of the grooved portion 24. In an embodiment, the grooved portion 24 includes a plurality of grooves 24a. In an embodiment, each of the plurality of grooves 24a is an annular groove. In another embodiment, each of the plurality of grooves 24a is a helical groove. In another embodiment, the grooved portion 24 includes a single helical groove. In an embodiment, the grooved portion 24 includes a diameter that is less than a diameter of the smooth portion 22. In an embodiment, the cylindrical-shaped portion 26b of the transition portion 26 includes a diameter that is less than a diameter of the smooth portion 22. In an embodiment, the frusto conical-shaped portion 26a of the transition portion 26 tapers towards the cylindrical-shaped portion 26b. In an embodiment, the shank 16 of the bolt 12 includes a pull portion 28 located at the second end 20 of the shank 16, and a second transition portion 30 located intermediate the grooved portion 24 and the pull portion 28. In an embodiment, the second transition portion 30 includes a frusto-conical shaped portion 30a located adjacent to an opposite end of the grooved portion 24 and a cylindrical-shaped portion 30b located intermediate the portion 30a and one end of the pull portion 28. In an embodiment, the cylindrical-shaped portion 30b of the second transition portion 30 includes a diameter that is less than a diameter of the grooved portion 24. In an embodiment, the frusto conical-shaped portion 30a of the second transition portion 30 tapers towards the cylindrical-shaped portion 30b. In an embodiment, the pull portion 28 includes a plurality of pull grooves 28a. In an embodiment, each of the plurality of pull grooves 28a is an annular groove. In another embodiment, the pull portion 28 includes a single pull groove 28a. In another embodiment, the pull portion 28 includes at least one pull groove 28a. In another embodiment, the pull portion 28 includes a helical groove. In an embodiment, the bolt 12 includes a head 32 located at the first end 18 of the shank 16 and adjacent to the smooth portion 22. In an embodiment, the head 32 is an enlarged head.

Still referring to FIG. 1, in an embodiment, the outer sleeve 14 includes an elongated body 34 having a first end 36 and a second end 38 opposite the first end 36. In an embodiment, the body 34 has a cylindrical shape and a smooth exterior surface 40. In an embodiment, the body 34 includes an outer diameter that provides for a clearance fit through openings of work pieces, which shall be described below. In an embodiment, the body 34 includes an outer diameter that provides for a press fit or interference fit through the openings of the work pieces. In an embodiment, the outer sleeve 14 includes a head 42 located at the first end 36 of the body 34. The head 42 includes a first end 48 and a second end 49 opposite the first end 48. In an embodiment, the head 42 is enlarged. In an embodiment, the outer sleeve 14 includes an internal aperture 44 that extends though the head 42 from the first end 48 to the second end 49 and through the body 34 from the first end 36 to the second end 38 thereof. In an embodiment, the aperture 44 includes an elongated portion 45 that extends from the second end 38 to a location proximate to the first end 48 of the head 42, and a tapered portion 47 located adjacent to one end of the elongated portion 45 proximate to the first end 48 of the head 42. In an embodiment, the tapered portion 47 tapers outwardly towards the first end 48 of the head 42. In an embodiment, the head 42 of the sleeve 14 includes an inner face 46 located adjacent to the tapered portion 47 at the end 48 thereof and is in communication with the aperture 44. In an embodiment, the inner face 46 is concave in shape. In another embodiment, the inner face 46 is conical in shape. In an embodiment, the inner face 46 extends obliquely at an included angle A measured transversely from a longitudinal axis X-X of the fastener 10. In an embodiment, the included angle A is about 60 degrees. In an embodiment, the included angle A is about 70 degrees. In an embodiment, the included angle A is about 80 degrees. In an embodiment, the included angle A is about 90 degrees. In an embodiment, the included angle A is about 100 degrees. In another embodiment, the included angle A is about 110 degrees. In another embodiment, the included angle A is about 120 degrees. In another embodiment, the included angle A is about 130 degrees. In another embodiment, the included angle A is about 140 degrees. In another embodiment, the included angle A is about 150 degrees. In another embodiment, the included angle A is about 160 degrees. In another embodiment, the included angle A is about 170 degrees. In an embodiment, the included angle A is about 180 degrees. In another embodiment, the included angle A is within a range of about 60 degrees to about 180 degrees.

Figure 2:
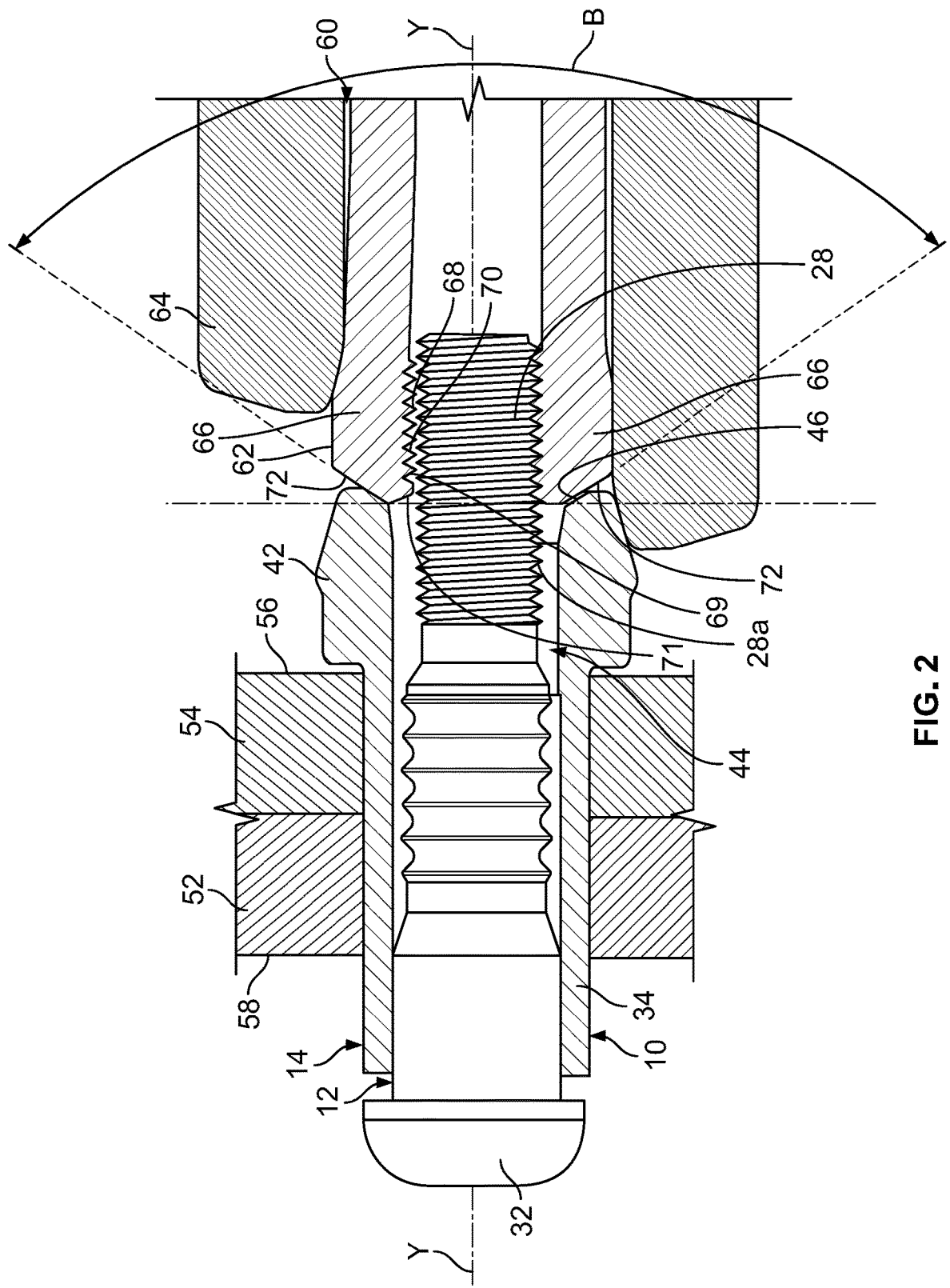
FIG. 2 is a side elevational view of the blind fastener shown in FIG. 1 positioned within work pieces and engaged by a fastener installation tool, with the outer sleeve, the tool, and the work pieces being shown in cross-section.

Referring to FIG. 2, in an embodiment, the fastener 10 is adapted to secure a plurality of work pieces 52, 54 together. In an embodiment, the bolt 12 is inserted within the aperture 44 of the sleeve 14 such that the head 32 of the bolt 12 is adapted to sit on and be juxtaposed with the second end 38 of the sleeve 14, and at least a portion of the pull portion 28 of the bolt 12 extends outwardly from the head 42 of the sleeve 14. In an embodiment, the entire pull portion 28 of the bolt 12 extends outwardly from the head 42 of the sleeve 14. In an embodiment, the fastener 10 is inserted through holes of the work pieces 52, 54, with the head 42 of the sleeve 14 abutting one side 56 of the work piece 54, and at least a portion of the elongated body 34 of the sleeve 14 extending outwardly from one side 58 (i.e., the blind side) of the work piece 52.

Still referring to FIG. 2, in an embodiment, a fastener installation tool 60 includes a puller 62 and a swage anvil 64. In an embodiment, the puller 62 includes chuck jaws 66 having internal teeth 68 and pull grooves 70 that are sized, shaped and adapted to grip the pull grooves 28a of the pull portion 28 of the bolt 12. In an embodiment, the internal teeth 68 includes at least one tooth 69 proximate to an engagement end 71 of the puller 62 and having a first inner diameter, while the remainder of the teeth 68 each have a second inner diameter which is less than the first inner diameter. By opening up the first inner diameter of the at least one tooth 69, as shown, chipping of the tooth 69 is resisted. In an embodiment, the pull grooves 70 of the puller 62 are helical grooves. In another embodiment, the pull grooves 70 of the puller 62 are annular grooves. In another embodiment, the pull grooves 70 of the puller 62 match the pull grooves 28a of the pull portion 28 of the bolt 12. In another embodiment, the puller 62 includes at least one pull groove 70. In another embodiment, the puller 62 includes a single pull groove 70. In an embodiment, the pull grooves 70 of the puller 62 are formed by tapping. In an embodiment, the puller 62 is a split collet. In an embodiment, the chuck jaws 66 of the puller 62 include a front face 72. In an embodiment, the front face 72 is angled at an included angle B measured transverse to a longitudinal axis Y-Y of the puller 62. In an embodiment, the included angle B is chosen to match or be substantially the same as the included angle A of the inner face 46 of the head 42 of the sleeve 14. In an embodiment, the included angle B is about 60 degrees. In an embodiment, the included angle B is about 70 degrees. In an embodiment, the included angle B is about 80 degrees. In an embodiment, the included angle B is about 90 degrees. In an embodiment, the included angle B is about 100 degrees. In another embodiment, the included angle B is about 110 degrees. In another embodiment, the included angle B is about 120 degrees. In another embodiment, the included angle B is about 130 degrees. In another embodiment, the included angle B is about 140 degrees. In another embodiment, the included angle B is about 150 degrees. In another embodiment, the included angle B is about 160 degrees. In another embodiment, the included angle B is about 170 degrees. In an embodiment, the included angle B is about 180 degrees. In another embodiment, the included angle B is within a range of about 60 degrees to about 180 degrees.

Referring to FIG. 2, in an embodiment, the fastener 10 is positioned within the holes of the work pieces 52, 54 as described above. In an embodiment, the jaws 66 of the puller 62 are split and spread to an open position in order to clear and slip over the pull portion 28 of the bolt 12. In an embodiment, the teeth 68 and the pull grooves 70 of the puller 62 engage the pull grooves 28a of the pull portion 28 of the bolt 12. In an embodiment, the face 72 of the jaws 66 of the puller 62 stops against the inner face 46 of the head 42 of the sleeve 14 to align the puller 62 properly with the pull portion 28 of the bolt 12. Along these lines, the inner face 46 of the head 42 of the sleeve 14 permits the puller 62 to shift forward toward the sleeve 14 at distance or backward away from the sleeve 14 at another distance, depending on how the teeth 68 of the puller 62 engage initially the pull grooves 28a of the pull portion 28 of the bolt 12 while closing, and align the teeth 68 of the puller 62 with the pull grooves 28a of the pull portion 28 of the bolt 12. The puller 62 can then slide downward and inward towards the face 46 at a distance as the puller 62 is driven forward when engaging the pull portion 28. Once the puller 62 is aligned with the pull portion 28, namely, the teeth 68, grooves 70 and pull grooves 28a are aligned properly, the jaws 66 of the puller 62 are then moved inwardly to a closed position and clamp down on the pull portion 28 and provide an axial force on the bolt 12 and close any gap between the work pieces 52, 54. The anvil 64 then engages and swages the sleeve 14.

Referring to FIG. 2, the puller 62 continues to provide an axial force on the bolt 12. In embodiments, the sleeve 14 can form various expanded blind side shapes as the bolt 12 is pulled into or against the outer sleeve's 14 blind side. In an embodiment, a portion of the elongated body 34 of the outer sleeve 14 is compressed and swaged into the grooved portion 24 of the bolt 12. In an embodiment, the pull portion 28 remains as part of the shank 16 after installation of the fastener 10. In another embodiment, the pull portion 28 is broken off from the shank 16 after installation of the fastener 10 (not shown in the Figures).

It should be understood that the embodiments described herein are merely exemplary and that a person skilled in the art may make many variations and modifications without departing from the spirit and scope of the invention. For instance, the fastener 10 is a blind fastener. In other embodiments, the fastener 10 can comprise other types of fasteners known in the art. All such variations and modifications are intended to be included within the scope of the claims.

What is claimed is:
1. A fastening system, comprising:
a fastener including a bolt having a shank and a pull portion extending from a first end of the shank and including at least one pull groove, and a sleeve adapted to receive the bolt,
wherein the sleeve includes a body having a first end and a head located at the first end, wherein the head includes a first end having an inner face; and
a fastener installation tool including a puller having a front face and at least one tooth that is adapted to engage the at least one pull groove of the pull portion of the bolt, and
wherein the inner face of the sleeve is adapted to receive and engage the front face of the puller of the fastener installation tool such that the front face of the puller is adapted to stop against the inner face of the head of the sleeve of the fastener and the puller is adapted to shift toward or away from the sleeve and align the at least one tooth of the puller with a corresponding one of the at least one pull groove of the pull portion of the bolt.

2. The fastening system of claim 1, wherein the inner face of the head of the sleeve of the fastener extends at a first included angle measured transversely from a longitudinal axis of the fastener.

3. The fastening system of claim 2, wherein the front face of the puller of the fastener installation tool is angled at a second included angle measured transversely from a longitudinal axis of the puller of the fastener installation tool.

4. The fastening system of claim 3, wherein the first included angle is within a range of about 60 degrees to about 180 degrees.

5. The fastening system of claim 4, wherein the second included angle is within a range of about 60 degrees to about 180 degrees.

6. The fastening system of claim 2, wherein the front face is concave in shape.

7. The fastening system of claim 2, wherein the front face is conical in shape.

8. The fastening system of claim 1, wherein the at least one pull groove includes a plurality of pull grooves, and wherein the at least one tooth includes a plurality of teeth.

9. The fastening system of claim 8, wherein each of the plurality of pull grooves is an annular groove.

10. The fastening system of claim 1, wherein the at least one pull groove is a helical groove.

11. A fastener, comprising:
a bolt having a shank and a pull portion extending from a first end of the shank and including at least one pull groove; and
a sleeve adapted to receive the bolt,
wherein the sleeve includes a body having a first end and a head located at the first end, wherein the head includes a first end having an inner face, and wherein the inner face of the sleeve is adapted to receive and engage a front face of a puller of a fastener installation tool such that the front face of the puller is adapted to stop against the inner face of the head of the sleeve of the fastener and the puller is adapted to shift toward or away from the sleeve and align the at least one tooth of the puller with a corresponding one of the at least one pull groove of the pull portion of the bolt.

12. The fastener of claim 11, wherein the inner face of the head of the sleeve of the fastener extends at a first included angle measured transversely from a longitudinal axis of the fastener.

13. The fastener of claim 12, wherein the front face of the puller of the fastener installation tool is angled at a second included angle measured transversely from a longitudinal axis of the puller of the fastener installation tool.

14. The fastener of claim 13, wherein the first included angle is within a range of about 60 degrees to about 180 degrees.

15. The fastener of claim 14, wherein the second included angle is within a range of about 60 degrees to about 180 degrees.

16. The fastener of claim 11, wherein the front face is concave in shape.

17. The fastener of claim 11, wherein the front face is conical in shape.

18. The fastener of claim 11, wherein the at least one pull groove includes a plurality of pull grooves, and wherein the at least one tooth includes a plurality of teeth.

19. The fastener of claim 18, wherein each of the plurality of pull grooves is an annular groove.

20. The fastener of claim 11, wherein the at least one pull groove is a helical groove.

* * * * *